Nov. 9, 1937. W. L. WALKER 2,098,266
DISTANCE FINDER
Filed Dec. 28, 1929 3 Sheets-Sheet 3
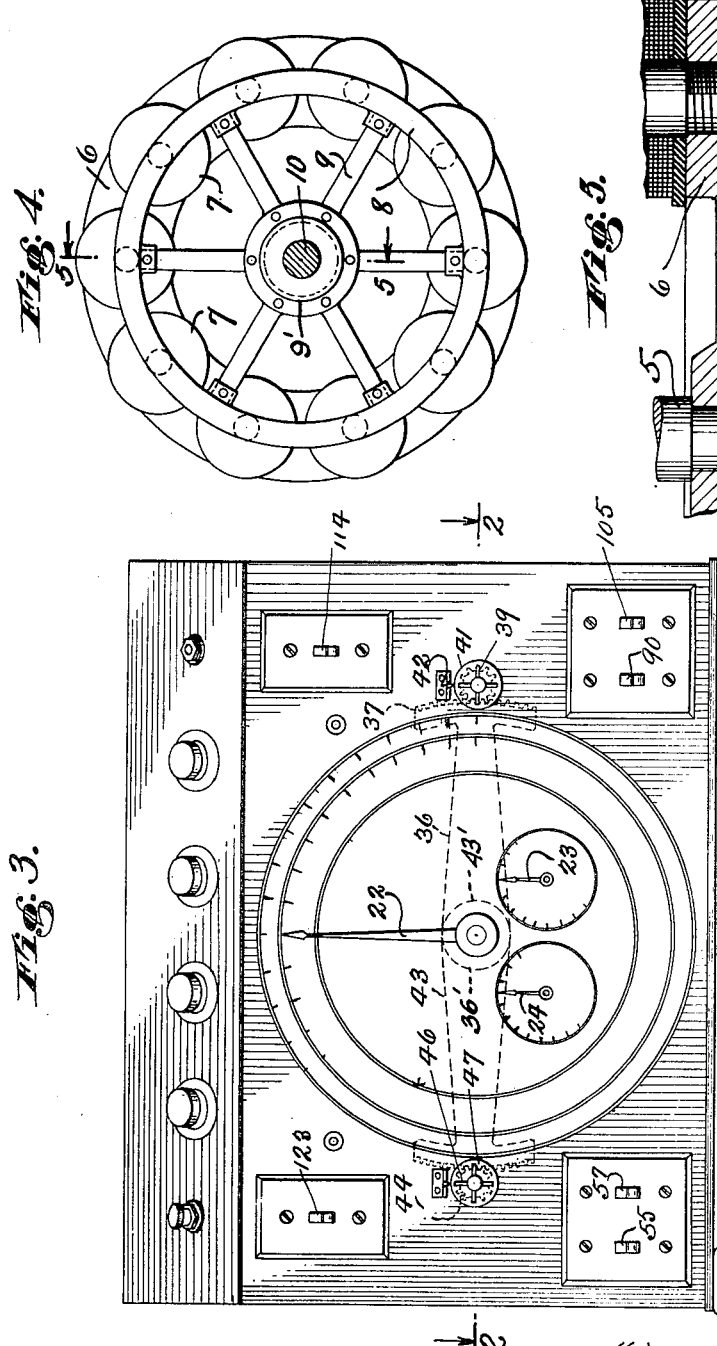
INVENTOR.
William L. Walker
BY
Kiddle Marquis and Horridge
ATTORNEYS.

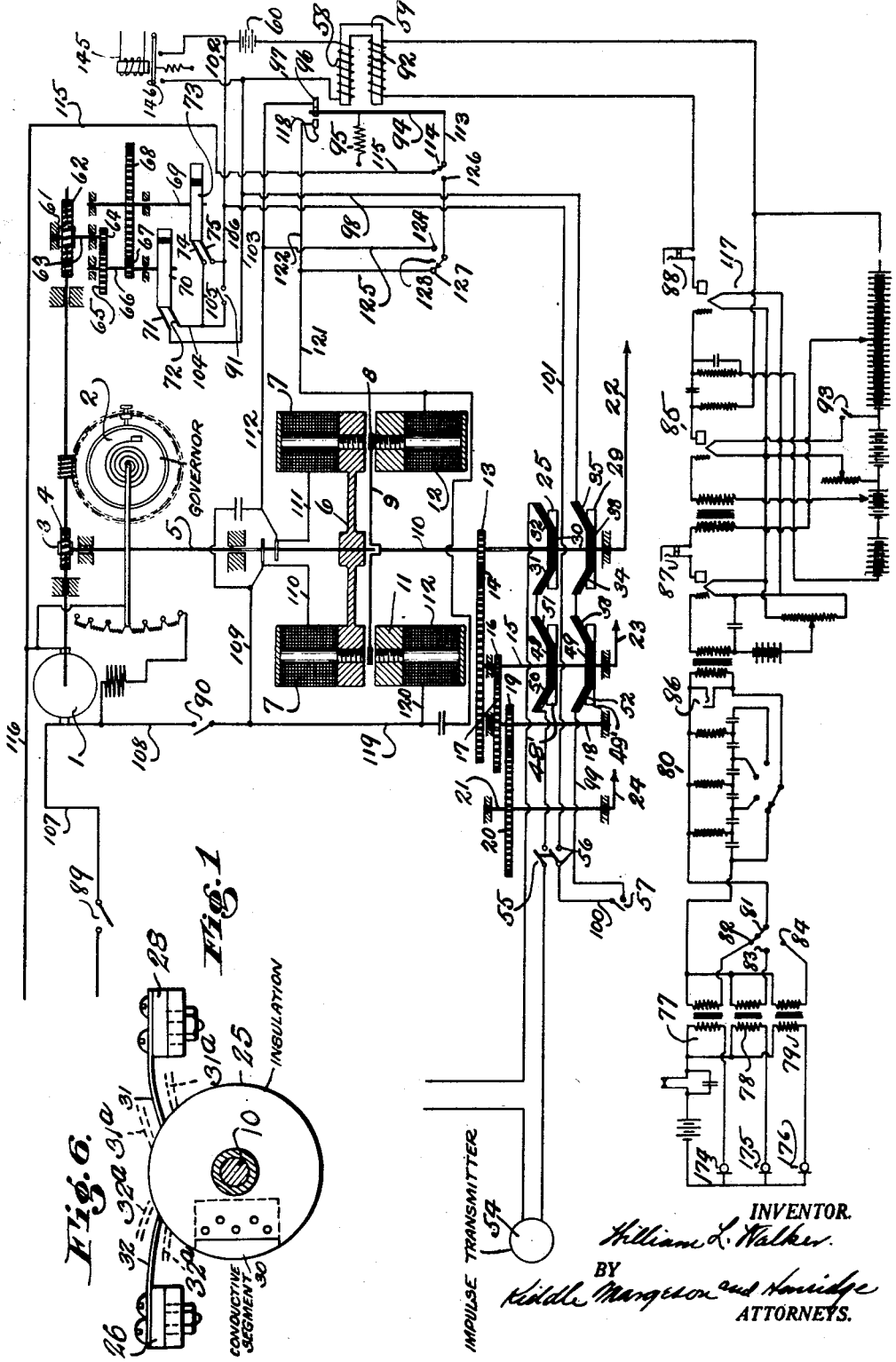

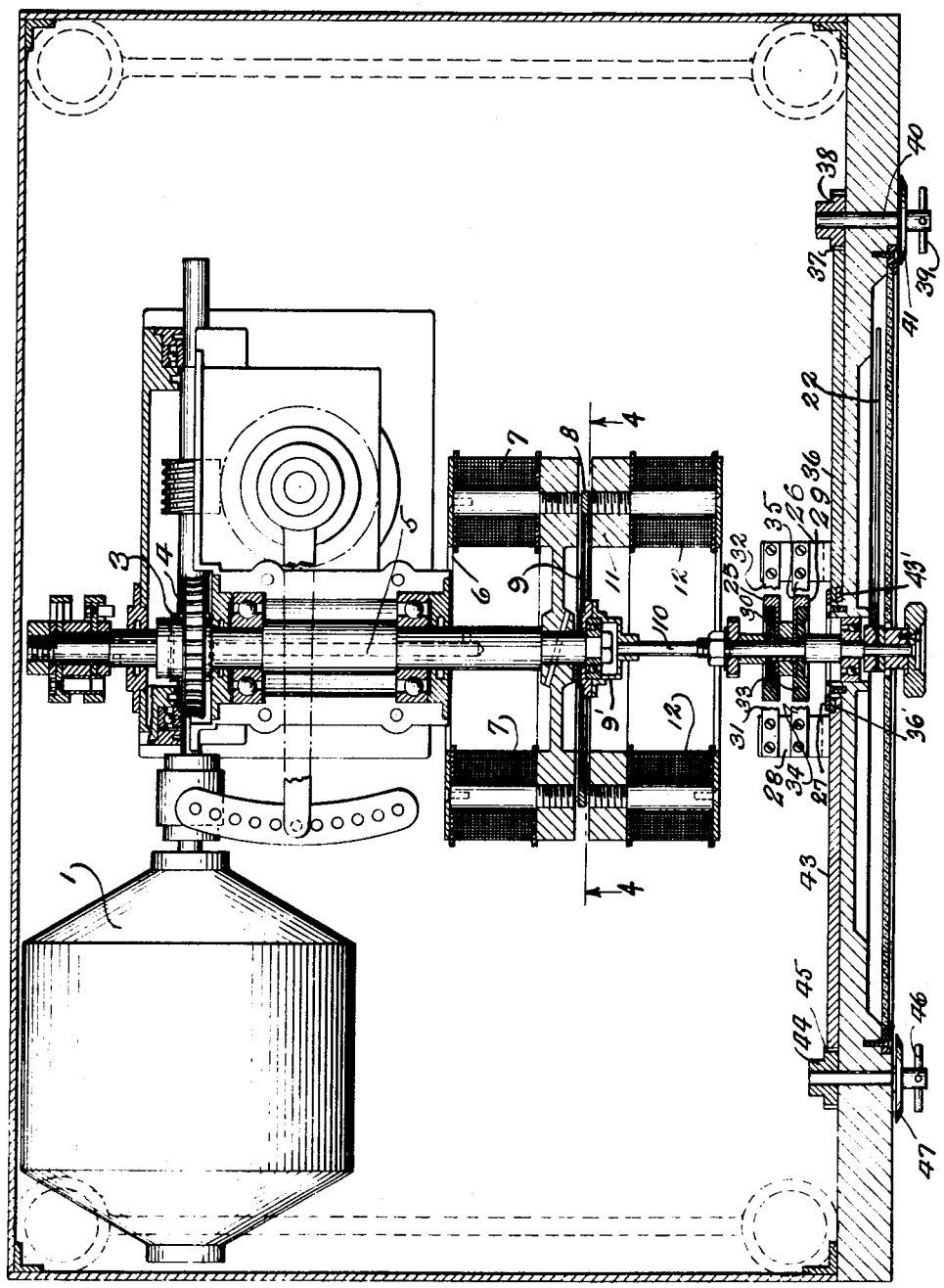

Patented Nov. 9, 1937

2,098,266

UNITED STATES PATENT OFFICE 2,098,266

DISTANCE FINDER

William L. Walker, New York, N. Y.

Application December 28, 1929, Serial No. 417,122

11 Claims. (Cl. 177—386)

This invention relates to improvements in distance finders and has for one of its objects the provision of a method of, and apparatus for, determining the distance between two points. Although the invention will be described mainly in connection with determining distance in a vertical direction through water, that is, in sounding operations, it is to be understood that the same is merely for comprehensiveness of description, inasmuch as the invention is equally well adapted for determining the distance between two points regardless of their relative positions as concerns vertical or horizontal planes. The invention is also independent of the type of intervening medium.

Briefly my invention is based on the speed of sound in an intervening medium such as water, air, etc., and with this factor known sound vibrations may be produced at the transmitting end of the system which vibrations are thereafter made appreciable by the operation of a recorder at the receiving end of the system. The sound vibrations may be reflected from an object of greater density than intervening medium and whose distance from the transmitter is to be determined. The reflected sound vibrations or echoes set up by electric impulses initiated at or adjacent the transmitting end of the system, actuate the indicator or recorder. Knowing the speed of sound in the medium through which the vibrations are transmitted, it will be obvious that by proper calibration of an indicator or a recorder, a reading may be taken in yards, fathoms or any other desired unit of measurement, thereby indicating the distance between the point from which the signal or echo starts and the receiving devices.

In the form of the apparatus herein described, the mechanism may be started to send out the necessary vibrations or impulses and thereafter during the operation of the mechanism the distances or depths will be successively indicated by pointers operated by the receiver.

With reference to further details, the present invention provides for the sending out of a signal which is reflected from an object of different density. This reflected sound or echo in the present case stops the movement of indicating pointers as it passes over a properly calibrated dial, the pointers having been set into operation by the closing of the circuit for producing the outgoing impulses or sound. The apparatus is so arranged that the pointers are held stationary for a short period of time or a few seconds more or less after the receipt of the echo so that the indicating mechanism is at rest during that time for the purpose of making readings, but the main actuating portions of the apparatus are still in operation. After such short period of time, the movements of the pointers are then continued by mechanism hereafter to be described so that one of the pointers again passes through the zero point and when adjacent that point the sound is again emitted. This occurs at the completion of a predetermined number of revolutions of the last-mentioned pointer. This enables the apparatus when once started to send out successive sound impulses or vibrations without manual operation to start and stop the mechanism.

Thus the apparatus itself directly indicates the depths or distances so that they do not have to be transcribed and automatically emits the sounds instead of requiring manual operation to produce such emission.

The basic factors underlying finding the distance of a vessel or other vehicle from another point and the depth of water in which the vessel is moving are substantially the same. In distance finding a radio signal is usually sent out by a light vessel or similar source, simultaneously with a signal from a vibrating device, but in submarine sounding the sound signal is initiated by the vessel itself. In both instances the point of initiation of the signal which determines the time of starting thereof is the primary signal. That, in finding the distance from a light vessel or similar source, is the radio signal that is transmitted practically simultaneously with the submarine sound signal. The submarine sound transmitted through the water is the complementary signal. In depth finding the oscillator sound that is transmitted by the vessel itself is the primary signal while the echo thereof reflected from the bottom is the complementary signal. In either case primary and complementary signals are necessary factors.

For a detailed description of one form of my invention reference may be had to the accompanying drawings forming part of this application, in which Figure 1 is a schematic diagram of the electrical circuits suitable for use in practicing my invention;

Fig. 2 is a horizontal sectional view of the distance measuring mechanism along the line 2—2 of Fig. 3;

Fig. 3 is a front elevation of the apparatus;

Fig. 4 is an elevational view partly in section of the electromagnetic operating parts taken substantially along the line 4—4 of Fig. 2;

Fig. 5 is a vertical section taken substantially on the line 5—5 of Fig. 4, and

Fig. 6 is a side elevation of one of the disks shown near the bottom of Fig. 2.

Referring to the drawings, particularly Fig. 1, the numeral 1 designates a shunt-wound motor provided with a mercury turbine governor 2 adapted to maintain the motor at constant speed. This type of governor being well known, it will not be described in detail. The switch 89 is in the main power line which feeds the motor 1. On the shaft of the motor 1 is a worm or pinion 3 which meshes with a worm gear 4 mounted on the drive shaft 5. This shaft preferably extends at right angles to the motor shaft.

On the shaft 5 and fixed thereto is the rotor 6 of an electromagnetic clutch. This rotor, as will be seen from Fig. 4 comprises a disk carrying a plurality of magnet coils or spools indicated at 7, ten spools being shown in the drawings merely by way of illustration. Located close to and concentric with the clutch member 6 is a ring armature 8 which is mechanically connected by flexible bronze or other suitable metallic spokes or arms 9 to a housing 9' (Fig. 4) fixed on the shaft 10 and in alinement with the axis of the shaft 5. The arms 9 bend laterally and allow the ring 8 to sway laterally as shown in Fig. 5. The shaft 10, as will be further pointed out, carries a pointer 22 or other indicating device, the positions of which indicate the distances to be determined. Immediately opposite the rotor 6 and the ring armature 8 is the stator 11 of the clutch mechanism. This stator is substantially a duplicate of the rotor 6 as concerns the number and position of the magnet coils or spools which are indicated by the numeral 12. The rotor 6 and the stator 11 are supplied with electric current through the switch 90 connected with the main power line, as shown.

It will now be apparent that when the rotor 6 is energized by an electric current, it will attract the armature 8 and its rotation will impart the same rotation to the armature 8 and to the shaft 10. On the other hand, when the rotor 6 is demagnetized and the stator 11 is energized the latter will draw the armature 8 into contact with it, thereby stopping the rotation of the shaft 10.

The shaft 10 is provided with a gear 13 fixed thereto, (Fig. 1), said gear meshing with a larger gear 14 carried on the shaft 15 extending parallel with the shaft 10. The shaft 15 carries a gear 16 which meshes with the gear 17 on the shaft 18, also parallel with the first two. The latter shaft carries a gear 19 which meshes with the gear 20 on another parallel shaft 21.

The shaft 10 carries the indicating pointer 22, the shaft 15 a pointer 23 and the shaft 21 a pointer 24. The purpose of the gearing or gear trains above mentioned is to produce the desired reduction in the angular rotation between the shafts 10, 15, and 21, thereby producing differences in the rates of rotation of the indicators or pointers 22, 23, and 24.

The shaft 10 is provided with an insulating disk 25 (Fig. 6) having a conductive contact segment indicated by 30 which is adapted to cooperate with a pair of relatively adjustable brushes 31 and 32. The shaft 10 is also provided with an insulating disk similar to the first and having a contact segment 33 adapted to cooperate with a similar pair of relatively adjustable brushes 34 and 35. The relative mountings of the segments and the brushes are shown more clearly in Figs. 2 and 6.

The brushes 32 and 35 are mounted on the support 26 extending from a rack controlled arm 36 which is angularly movable about the axis of the shaft 10. This movement is permitted by reason of the fact that the arm 36 carries an annular segment 36' forming a collar which is held in position by the ring 27 carried by the front panel. The outer end of the arm 36 is provided with a rack 37, (Fig. 3), the teeth of which engage a pinion 38 which is rotated by a small hand wheel or knob 39. The shaft 40 connecting the knob 39 and the pinion 38 may be provided with a disk or dial 41 adjacent which is a fixed marker 42 whereby the amount of rotation of the knob 39 may be indicated. This arrangement consequently permits the simultaneous adjustment of the brushes 32 and 35 with respect to the contact segments 30 and 33, on the disks 25 and 29, respectively.

The brushes 31 and 34 are similarly carried on a support 28 extending from an angularly movable arm 43 with reference to the axis of the shaft 10. The inner end of this arm is also provided with a segment 43' adjacent the beforementioned segment 36', both rings being held in position by the flange projecting from the front panel. The arm 43 is provided at its outer end with a rack 45, the teeth of which mesh with the teeth of a pinion 44, this pinion being capable of rotation by moving the small hand-wheel or knob 46. The latter is also preferably provided with a dial 47 by which the amount of movement of the knob 46 may be indicated by reference to a similar fixed marker as before mentioned. The arrangement last described thus also provides for the simultaneous adjustment of the brushes 31 and 34 with respect to the contact segments 30 and 33 respectively.

The shaft 15 (Fig. 1) is provided with insulating disks 48' and 49' having conductive segments 48 and 49 which cooperate with the brushes 50, 51, and 52 and 53 respectively. The brushes 50, 51, and 31, 32 are connected in series and the brushes 52, 53, 34, and 35 are likewise connected in series.

The contact segments 30, 33, 48, and 49 are of substantially the same construction as concerns the rotatable insulating disks on which they are carried and the brushes 50, 51, 52, and 53 can be adjusted when required by changing their positions on the supports on which they are mounted. The construction of the disks, conductive segments and their respective brushes is illustrated in Fig. 6 of the drawings.

In Fig. 6, certain displacements of the brushes 31ª and 32ª, so as to vary their contacts with the segment 30, are indicated by dotted lines and the numerals 31' and 32', respectively. Such changes not only allow the circuits to be completed at the proper points but also are used to control the length or duration of the signals emitted.

The numeral 54 designates an impulse generator, oscillator or other suitable form of transmitter, the circuit of which is controlled by the contact disks 30 and 48 and the brushes 31, 32 and 50, 51, so that by varying the position of the brushes 31 and 32 through different settings of the arms 43 and 36 respectively, the timing of the impulses from the transmitter or oscillator may be varied accordingly. The numeral 55 designates a switch in the oscillator or transmitter circuit. This is also provided with immediately adjacent contacts 56 which with the switch 57 and the brushes 52, 53, their contact segment 49 and the brushes 34 and 35 and the contact segment 33, are in series with an operating coil 58 on one arm of an electromagnetic relay 59 which is energized by current from the battery 60, acting in conjunction with the current in the plate circuit in the last amplifier tube, which passes through the coil 92 of the relay 59.

In addition to driving the distance measuring mechanism above described, the shaft 1 of the motor armature is provided with a worm 61 which meshes with the worm gear 62 on a shaft 63 extending parallel with the shaft 5. The shaft 63 carries a gear 64 which meshes with a gear 65 on another parallel shaft 66. The shaft 66 also carries a gear 67 meshing with the gear 68 on a third parallel shaft 69. The shaft 66 carries a disk 70 having a contact segment cooperating with a pair of brushes 71 and 72. Also the shaft 69 carries a disk 73 having a contact segment which cooperates with a pair of brushes 74 and 75. Supposing that the shaft 5 is rotating at 120 R. P. M., which is a factor of 4,800 feet per second, being approximately the velocity of sound in water—the gears of the gear trains are so proportioned as to cause the shaft 66 and the disk 70 to rotate at 6 R. P. M. and the shaft 69 and disk 73 at 1 R. P. M..

Referring again to the pointer 22, a scale or dial associated therewith may cover a distance of two hundred fathoms which may be divided into tens and single fathoms, as well as into half fathoms or yards. Between the shaft 10 and the shaft 15 there is preferably a five to one reduction which permits the pointer 23 of the shaft 15 to turn at 24 R. P. M. Since the contact segments 30 and 48 on their respective disks are in series connection the circuit to transmit the signals is not completed until the pointer 23 has made a complete revolution in 2½ seconds. The pointer 22 rotates five times during that period, at 120 R. P. M. This enables one to read accurately the scale associated with the pointer 23 which may be marked in hundreds of fathoms, by using the coarser scale of the pointer 22 in conjunction therewith. Furthermore, owing to the speed reduction of the pointer 23, a complete revolution thereof on its dial cannot take place between the respective sendings of the signal unless the depth is more than 6,000 ft. The third scale associated with the pointer 24 may be marked in yards and is used for indicating distances or larger multiples of the yard scale, since according to the gearing indicated, the shaft 21 rotates at 1.2 R. P. M. This enables one to read its corresponding scale which may, if desired, be divided into units of thousands of yards. A reading of the distances indicated by the three scales obviously allows accurate readings not only of comparatively short distances, but of much longer distances such as those of many miles of travel of the signals through the air and water respectively. It will be apparent that in getting longer distances which come within the limits of the slowest moving pointer 24 the switch 55 may be opened after the first echo has been received in depth finding, thereby stopping the local transmitter until the next sounding is desired.

The numerals 174, 175, and 176 designate three receiving devices such as microphones. Each of these microphones is provided with a transformer designated by 77, 78, and 79, respectively. Connection of these transformers with the filter system 80 is controlled by the switch arm 81 and the respective contacts 82, 83, and 84 which enables the desired receiver to be cut into the filter system. 85 indicates an amplifier circuit which is connected with the filter circuit.

The microphone circuit switch arm 81 can be used to connect any one of the microphones with the receiving portion of the distance finding circuit, by connecting said arm with the contacts 82, 83, or 84. In this connection, it is preferable to have one microphone located on the port bow, one on the starboard bow, and the third placed in the most suitable position for depth sounding, which location may be determined according to the structure of the particular vessel upon which the installation is made. The microphones may be installed on vessels according to the disclosures in my prior patents, viz: 1,579,460, April 6, 1926, 1,582,105, April 27, 1926, or 1,715,395, June 4, 1929, or otherwise. The purpose of providing three individual microphones is to give the echo sounding system the three-fold function of obtaining automatic sounding, as well as determining the direction or source of sound, such as sound beacons, and also receiving synchronized sound signals for distance determinations.

The vacuum tube amplifier circuit is in this instance of the well-known type comprising two tubes connected through transformers with the circuit, and one tube resistance coupled. This, it is thought, will be appreciated by one skilled in the art. However, for the purpose of indicating the approximate values of the parts of the circuits to be used, the following are suggested: The plate circuit of the first amplifier tube is connected through a primary of a 3½ to 1 ratio transformer to the 90 volt terminal of the plate battery. The secondary of this transformer is connected to the grid of a Hi-Mu vacuum tube and to the 1½ volt terminal of the grid bias battery. The plate circuit of this tube is connected to one side of a .005 mfd. condenser and with a .25 megohm resistor, the other terminal of the latter being connected to the positive end of the 110 volt plate battery. The opposite side of the coupling condenser is connected with the grid of a power tube (such as a UX 171-A tube) and with a 1-megohm grid leak, which is in turn connected with the negative terminal of a 27 volt grid bias battery. The output or plate circuit of the power tube is connected through a retaining coil 92 of the relay actuated by the armature 94 and with the 110 volt terminal of the plate battery. A closed circuit jack 88 is connected in series in the plate circuit leading to the relay coil so that a milliammeter may be inserted when necessary to test the output circuit of the amplifier.

Additional telephone jacks are also provided, one, 87, being in the plate circuit of the first tube of the amplifier, to allow the operator to listen to sound signals in connection with depth soundings, distance finding, and listening to sound transmitter signals. The other jack, 86, is of the open circuit type, and is connected directly across the primary of the first transformer and is for use in testing the output currents from the microphone and filter circuits without amplification.

To start the driving motor 1 and to energize the other portions of the apparatus, it is only necessary to close the switches 89 and 90 in the main supply circuit which comprises the leads 107, 108, and 116. As an example it may be assumed that readings are to be taken in successive periods of more than one minute each. In this event the switch 91 should be in open position. The closing of the switches 89 and 90 will complete a circuit to the motor 1 and the motor is thereafter allowed to come up to the required speed.

The position of the contacts on the disks 70 and 73 as determined by their respective shafts is such that when the switch 91 is left open, a circuit will be closed every sixty seconds to the operating coil 58 of the relay 59 when the motor 1 is running at such a speed that the shaft 5 of the timing device is driven at 120 R. P. M. This circuit of the operating coil 58 of the relay 59 which is controlled every sixty seconds by the contacts on the disks 70 and 73, may be traced from the lower side of the battery 60 through the coil 58, conductors 97, 103, brush 71, contact on disk 70, brush 72, conductors 104, 105, brush 74, contact on disk 73, brush 75, conductors 106 and 102, to the upper side of the battery 60.

The relay 59 is provided with a retaining coil 92 mounted on the other arm of its core and the latter is energized by the closure of the switch 93 in the leads to the filament of the second amplifier tube. Assuming also that the filament switch 93 is closed, it will be apparent that a circuit is completed through the coil 92 on the relay 59. The closure of the circuit for the coil 58 and the circuit for the coil 92 will so energize the magnet 59 that its armature 94 will be drawn into the positions shown in Fig. 1 and the contact 96 carried at the end of this armature will close a circuit through the coils 7 of the rotor 6 of the clutch device. This circuit may be traced from the switch 89, conductors 107, 108, switch 90, conductors 109, 110, coils 7, conductors 111, 112, contact 96, armature 94, conductor 113, switch 114, conductors 115 and 116, which is the other terminal of the power line. It will be understood, of course, that the magnet coils 7 of the rotor 6 of the clutch are arranged so that these coils will be energized simultaneously. The closure of the circuit for the rotor of the clutch will draw the armature ring 8 into engagement with the face of the rotating clutch member and the armature 8 will accordingly be rotated. This will rotate the shaft 10 together with the pointer 22 and the pointers 23 and 24 will be rotated through the action of the gear trains above described.

It was pointed out above that the brushes 50 and 51 and 31 and 32 which are in the oscillator circuit are adjustable with respect to the disks 48 and 36. It is also pointed out that the brushes 52 and 53 as well as 34 and 35 are adjustable with respect to the disks 49 and 33. It is to be assumed, therefore, that in adjusting this device for operation, the brushes 50, 51, and 31, 32 have been so set that if the oscillator 54 and the microphone 74 are considered as being placed side by side, a signal would be sent out from the oscillator 54 just an instant before the pointers 22 and 23 are passing their zero marks.

The brushes 52, 53, and 34, 35 being adjustable as to their cooperating conducting segments 49 and 33, may be so set that a circuit will be maintained through the energizing coil 58 of the relay for a short time during and after the transmitter 54 sends out its impulse or vibration, thereby through the completed circuit enabling the relay to be operated only by the receipt through the microphones of the oscillator signal which affects the coil 92 on the same relay. This allows the spring 95 to retract the armature 94 to open the circuit through the rotor and close the circuit through the fixed coils of the clutch device and stop the rotation of the armature 8.

An examination of the wiring diagram of Fig. 1 will show that, assuming the switch 57 is closed, operation of the switch 55 will close the energizing circuit to the coil 58 of the relay 59, that is to say, the closure of the switch 55 which closes a circuit to the oscillator or transmitting device 54, will at the same time close a circuit to said relay. This relay energizing circuit may be traced from the lower side of the battery 60 through the coil 58, conductors 97, 98, brush 35, segment 33, brushes 34, 53, segment 49, brush 52, conductor 99, switch 57, conductor 100, contacts 56 of the switch 55, conductors 101, 102 to the upper side of the battery 60.

The primary signal sent out from the transmitter or oscillator 54 strikes the object, the distance of which from the transmitter is desired to ascertain, and is reflected therefrom, the reflected signal or echo being received by one of the microphones 174, 175, and 176, the microphone which it was desired to use having been previously selected by operation of the switch arm 81. As illustrated, the microphone 174 is connected through the transformer 77 and the switch arm 81. The pulsation or pulsations of the current set up by the action of the microphone 174 will be filtered and amplified and the resulting drop of current in the plate circuit of the tube 117 of the amplifier will be sufficient to permit the spring 95 to snap the armature to the left at that instant so that the contact on the end of the armature comes into engagement with the fixed contact 118. The result of this action is to open the circuit of the rotor of the electromagnetic clutch 6 and to close the circuit to the stator 11 of the same clutch, thereby arresting the rotation of the ring armature 8 and consequently bringing the indicators 22, 23, and 24 to a stop on points which would indicate distance accurately. The circuit which is established by the engagement of the armature 94 with the fixed contact 118 may be traced from one side of the main line switch 89 through the conductors 107, 108, switch 90, conductors 119, 120, magnet coils 12 of the stator 11, conductors 121, 122, fixed contact 118, armature 94, conductor 113, switch 114, conductors 115 and 116 to the other terminal of the power line. It will be readily understood that the magnet coils 12 of the stator 11 are so connected that these coils will magnetize the stator simultaneously.

It will be appreciated from the foregoing description that I have provided an apparatus by which the distance between two points may be measured by the effect of the reflected sound that is transmitted from one point to the other, the speed of sound through the intervening medium being known. My improved method and apparatus provides for the sending or transmitting of a sound or impulse from a transmitting point and the reception of its reflection or echo. This sound thence travels to the object whose distance away from the transmitter is to be determined, the sound or echo being reflected by said object and returns to a microphone or other similar device located adjacent the transmitter. The operation of this receiving device by the echo or complementary signal causes the closure of the circuit through the stator of the electromagnetic clutch, the action of which will interrupt the movement of the indicators which were set into operation prior to the time the signal was sent out, or just before the pointers 22 and 23 pass the zero mark on their respective scales. The transmission of the signal from the sending apparatus is initiated a very short time before the pointer or pointers pass the zero position, in order to compensate for any slight lag which may be induced because of the time required to operate mechanically the moving parts of the recording apparatus. Since the pointers 22, 23 and 24 travel over suitable calibrated scales or dials and since the signals are sent out when one or more of these pointers are passing a zero position, the signal is sent through the medium whose rate of sound propagation is known. It will be apparent that by simply taking readings from the three dials or scales the distance of transmission may be calculated by the use of a suitable factor, or if these dials are calibrated in terms of fathoms or yards or multiples thereof, the distance may be read directly from the scales or dials.

For convenience in determining depth and distance, a dial of the pointer 22 may be calibrated in fathoms and yards and the dial of the pointer 23 also in fathoms and yards and the dial 24 in yards or multiples thereof. Obviously, the calibration of these dials will depend upon the density of the medium through which the signal is sent to determine the distance. It will be appreciated that in all cases the microphones 174, 175, and 176 are placed adjacent the oscillator or transmitter 54. In order that the proximity of the microphones to the oscillator may not cause the direct operation of the microphones by the outgoing signal, as distinguished from the reflected signal, I have provided as above noted an adjustment of the brushes on the segments such that the coil 58 of the relay 59 will remain energized for a small interval during and after the signal is sent out from the oscillator.

To obtain soundings in shallow water, it may be necessary to so locate the oscillator and microphone, respectively, that good shielding will be obtained between them by portions of the hull of the ship.

The jack 87 in the plate circuit of the first amplifier tube of the amplifier 55 is for the purpose of allowing the operator to listen to sound signals through the usual head telephones in connection with depth soundings, distance finding, as well as listening to the signals of the sound transmitter, as will be obvious from an inspection of the diagram. The jack 86 previously mentioned is of the open circuit type and is intended for use in listening to the incoming signals prior to the amplification, as well as for testing the action of the microphones and filter circuits.

A further object of providing three microphones or receiving devices 174, 175, and 176 is to accomplish the three-fold object of obtaining automatic soundings as above described, indicating the direction of sound beacons, and the use of synchronous sound and radio signals to determine distance. In this connection it will be desirable to have one microphone located on the port bow and one on the starboard bow, both of which may be used for listening purposes by the use of telephones, the third being placed in the most suitable location for depth soundings. These positions may be determined from a survey of the structure of any particular ship upon which the installation is to be made. The microphone switch 81 can thus be used to connect the port or starboard microphone with the input side of the amplifier for use in direction or distance finding and the depth microphone can also be connected for use in depth soundings. Direction is determined by the conventional swing method.

Reverting to the function of the pointers 22, 23, and 24, it may be noted that the shafts of these pointers are so geared that one revolution of the large pointer 22 may equal 800 yards, one revolution of the small pointer 23 will equal 4,000 yards and one revolution of the pointer 24 will equal 80,000 yards.

This device is useful, as above noted, to determine the distance between points in water or in the atmosphere, as in determining the distance from a ship to a station sending out synchronous radio and sound signals, for example, as is done by the Nantucket Shoals light vessel. The operator is provided with a head telephone set, one ear piece of which is connected to the radio receiver of the ship and the other to the sound receiving equipment. The operator will thus hear the radio signal instantly or substantially coincident with its transmission but the submarine sound signal will be received after a period of time equivalent to the speed of transmission of the sound which travels through the water at a velocity of 4,800 feet per second over the distance which exists between the light vessel and the ship on which the operator is listening. At the instant of reception of the radio signal, the pointers having been manually set to zero may be started by a switch 123 (Fig. 1), the closing of this switch on contact 124 establishing a circuit for the magnet coils 7 of the rotor 6, at the same time breaking the circuit through the coils 12 of the stator 11. This circuit may be traced from one side of the main line switch 89 through conductors 107, 108, switch 90, conductors 109, 110, magnet coils 7, conductors 111, 112, 125, contact 124, switch arm 123, contact 126, switch arm 114 (the arm 114 being moved to the left), conductor 115, and thence to the other terminal of the power line 116.

The pointers 22, 23 and 24 will now start rotating and at the instant the operator who is listening in at the jack 87 for instance, hears the sound signal, he opens the switch 123 by moving the arm into the position shown on the diagram which opens the circuit of the rotor of the switch and closes a circuit to the stator of the clutch, thereby bringing the pointers to rest.

Inasmuch as this is not a reflected sound, it will be found convenient to provide the pointer 22 with two dials, the outer one for example being used in depth finding where the oscillator 54 is employed while the inner one may be used for determining the distance between two points from which synchronized radio and sound signals are sent out.

When the received sound is not sufficiently strong to cause operation of the relay 59, the sound may be heard audibly by listening through the telephones. In this case the telephone receiver may be plugged in at the jack 87, the sound being sent out in the normal way by the oscillator 54. It will be understood that the contact arms of the switches 114 and 123 will be placed on the contacts 126 and 124 respectively. When the echo is heard in the head set by the operator, the switch 123 is moved to close on contact 127, which will complete a circuit to the stator of the electromagnetic clutch to bring the pointers of the device to rest.

It would also be appreciated that it is possible to read the position of the pointers on the scales or dials when the echo arrives, without stopping the pointers. In such a case the signals or oscillations would be sent out when a pointer is substantially at zero and the receipt of the echo indicated by the sound in a telephone head set.

For testing the timing of the indicating pointers of the machine, the switch 57 may be opened to allow the sound from the transmitter 54 to reach the microphones 174, 175, and 176 directly, thereby operating the relay 59. The transmitter 54 being located at a different position on the hull of a ship from the microphone being used, a certain time will elapse between the emission of the sound and its receipt by the microphone. In such case the adjustment is made by moving the brushes on the contact disks 30 and 33 by means of the rack arms 36 and 43, until the large pointer stops at a point representing one-half known distance between the transmitter and receiver that are located at the two separated points on the hull of the ship. One-half the distance is used because of the fact that the sound thus transmitted and received is not reflected as in the usual case of distance finding or depth soundings, in which the actual distance or depth is one-half the total distance that the sound waves must travel.

It will be appreciated that in connection with the brushes 31 and 32, 34 and 35 and their contact segments 30 and 33, that the duration of the outgoing signal from the transmitter 54 is determined by the relative positions of these brushes as they pass over their respective contact segments. Consequently, when adjusting the machine, the switch 57 is opened, permitting the direct reception of the signal, as distinguished from the echo which operates the relay 59.

When the test switch 57 is closed, the completion of the circuit through the coil 58 of the relay by means of the contact segments 33 and 49 is assumed to coincide with the arrival of the signals transmitted directly to the microphones and the amplifier, that is to say, the direct sound from the transmitter 54 as distinguished from an echo, but if the closing of the circuit through the relay coil 58 does not coincide with the arrival of the direct sound, it can be made to do so by adjusting the disk on its shaft 10 until the test shows the disk to be in the right position.

If desired, my device may be operated automatically so far as the synchronized radio and sound signals sent from a light ship or other point are concerned. This is done by utilizing the radio receiving set on a ship equipped with my apparatus to start the motions of the pointers. In this connection, the output of the radio receiver will be connected with a relay coil indicated at 145, which is adapted to operate an armature 146, which acts to control the circuit through the coil 58. Upon the reception of the radio signal sent out by the light ship or other station, the coil 145 will be energized so as to allow the armature to close the circuit to the rotor member of the clutch through the action of the relay or switch 146 and the battery 60, and thereby start the motion of the indicators from zero positions where they have been placed by the operator. When the complementary sound initiated simultaneously with the radio signal and transmitted from the same station is picked up by the microphone, it will be amplified in the amplifier and will cause a current drop in the plate circuit and the relay coil 92. This will release the armature 94 which then acts to close the circuit through the stator member of the clutch and thus stop the pointer or recorder.

The operation of the apparatus in depth finding may be briefly stated as follows, assuming the various switches controlling the power circuits to the motor, clutch mechanism, primary microphone, amplifier and oscillator to be closed, together with the switch to the main line circuit, i. e., switches 89, 90, 55, 93 closed, and arm 114 connected to contact 113.

The metal segment on the insulating disc 70, on account of the gear trains 65, 64, 61, 62 and intermediate shafts connected to the constant speed motor 1, will electrically connect the brushes 71, 72 every tenth second. The metal segment on the insulating disc 73 will, for similar reasons, electrically connect the brushes 74 and 75 every minute. The metal segments on discs 70 and 73 are placed so in relation to each other that every time the metal segment on the disc 73 connects the two brushes 75 and 74, the metal segment on the disc 70 will connect the brushes 71 and 72. It will now be apparent that if the switch 91 is open, the circuit through the battery 60, magnet coil 58, lines 97, 103, brush 71, the contact segment on the disc 70, brush 72, line 105, brush 74, the metal segment on the disc 73, brush 75, lines 106 and 102 to the battery 60 will be completed for a short period of time every 60th second.

If the switch 91 is closed, the above circuit will be completed every time the metal segment on the insulating disc 70 electrically connects the brushes 71 and 72, which happens every tenth second.

Now, suppose the switch 91 is closed, the magnetic flux induced by the coil 58 will help the magnetic flux induced by the magnet coil 92 to close, or pull over to the right, the relay armature 94. This will close the circuit beginning from one side of the line through the switch 89, line 107, 108, switch 90, line 109, 110, the series coupled magnet coils 7, line 111, 112, contact 96, armature 94, line 113, switch 114, line 115, 116 to the other side of the line. That circuit is established only during the period of the outgoing signal and thereafter the armature 94 will be held in its last mentioned position by the current in the coil 92. The magnet coil 7 will now attract the clutch armature 8 and the friction between said armature and the rotor 6 will start to rotate the armature with its shaft 10, gear 12, contact discs 30 and 33, and pointer 22 at the same constant speed of 120 R. P. M. which the rotor has.

The gear 13 connected to the gear 14 of the shaft 15 will rotate said shaft with its contact segments 48 and 49 and the pointer 23 at a speed of 24 R. P. M. The contact segments 48 and 30 are placed so in relation to each other that every time contact segment 30 electrically connects the two brushes 31 and 32, contact segment 48 will connect the two brushes 50 and 51 and for a short time complete the circuit through oscillator 54. This happens just before the pointers 22 and 23 pass zero on respective scales; the pointer 22 is traveling over a scale 12" in diameter and divided into 200 divisions, each division being equal to the depth of one fathom; the pointer 23 is traveling over a scale about 4" in diameter, divided into 40 divisions, each division being equal to a depth of 25 fathoms. The signal produced will travel to the bottom of the ocean, the echo reflected and picked up by the microphone 74, pass through the filter 80 (the filter being provided to allow only the signal with a frequency of 1000 cycles to pass), amplified in the three-tube amplifier, passes through the third tube, which will cause a current drop in the plate circuit of this tube, thus partly demagnetizing the relay 59 and allow the spring 95 to open or pull the relay armature 94 over to the left. This will complete the circuit beginning at one end of the line through switch 89, line 107, 108, switch 90, line 119, 120, the series coupled magnet coils 112, line 121, relay armature 94, line 113, switch 114, line 115, 116 to the other end of the line. This will break the current through the magnet coils 7, demagnetize the rotor magnet and allow the clutch armature 8 to be free. The magnetism induced by the magnet coils 12 will pull the armature 8 against the stator 11 and the attraction between the armature 8 and the stator 11 will stop said armature and its shaft 10, etc., and hold it in a fixed position. It is obvious, considering the calibration of the scale and sending out the signal just before the pointers 22 and 23 pass zero of said scales, that the distance traveled by the pointers 22 and 23 before they are stopped, will indicate the depth. Now, suppose the depth was 50 fathoms when the metal segment on disc 70 closes the circuit through brushes 71 and 72, thus starting up the pointers again; the pointers will start to rotate from the position indicating the last shown depth. They will continue rotating until both pointers again pass zero, before a new signal is sent out and again stop at a depth near 50 fathoms because in ten seconds the ship has not been able to move from the place where the depth was 50 fathoms to a place where the depth is much different. It thus will be apparent that since the contact on the disk 70 completes the circuit to the rotor of the magnetic indicator actuating device every 10 seconds, the signal will be initiated every 10 seconds but only just before the pointer 23 passes its zero position, as determined by the contacts 48 and 30 on their respective disks. When the echo or complementary signal is received by a microphone the motions of the pointers are arrested and remain fixed for the remainder of the 10 seconds. Thereupon the pointers start to rotate again and when the pointer 23 thereafter nears its zero position a primary signal is again emitted.

The rate of rotation of the disk 70 is preferably made such as to provide that the elapsed times between the completions of the circuit through the relay coil 58 connected with the brushes 71 and 72 are sufficiently long to permit the pointers 22 and 23 to be stopped at intermediate points during the intervals of 10 seconds when the switch 91 is closed. The oscillator signals are sent out when the pointers 22 and 23 are approximately at zero and the pointers remain at rest for the remainder of the 10 seconds that is long enough to allow the operator to make his readings after the echo has been received and before the pointers again start to rotate by completion of the circuit through the coil 58 by the conducting segment on disk 70.

Since the impulse signals are sent out only after the disk 70 has completed the circuit through the coil 58 every 10 seconds, that would allow of measurements of depths up to about 3600 fathoms with enough time remaining (9 sec. plus 1 sec.) to observe the reading of the depth. That can occur once during each interval of 10 seconds between the points that the circuits are established by the disk 70.

That particular arrangement therefore permits depth to be measured from a few fathoms down to 3600 fathoms.

In case the depth to be measured should be greater than 3600 fathoms the switch 91 can be opened. With that arrangement the circuit through the coil 58 would be completed once each minute. Receipt of the echo would stop the pointers and they would not be started again until the contacts on the disks 70 and 73 cooperated to close the circuit through the coil 58 to attract the armature of the relay. That would enable depths to be measured down to 20,000 fathoms or 120,000 feet in about 50 seconds.

Since the rotations of the shafts 10 and 15 would cause the primary signal to be sent out every 2½ seconds, the switch 55 can be opened to prevent the sending out of another oscillation before the echo of the first one is received.

In the following claims the transmitted pulsations or oscillations whether sent from the transmitter adjacent the receiver or by a radio transmitter at a distant point are referred to as the "primary signal" and the received reflected sound or echo or the sound sent out from a distant point such as a light vessel or similar distant station simultaneously with the radio signal is referred to as the "complementary signal".

What I claim is:—

1. In distance finding, apparatus by which the time elapsing between the occurrence of a primary signal and the receipt of a complementary signal is indicated by a rotatable indicator, the improvements which comprise, sound-receiving devices, a rotatable indicator, rotatable driving means therefor, a separable connection between said driving means and said indicator, said connection comprising an electric clutch which includes an electro-magnetic member continuously rotated by said driving means, a resiliently and swayably supported annular armature carried rotatably in close proximity to said electro-magnetic member and having positive connection with said indicator, a fixed electro-magnetic member or stator mounted opposite and close to said armature, an energizing circuit for said rotary magnetic member that is closed substantially simultaneously with the occurrence of the primary signal to attract said armature for making said driving means operative to cause said armature and said indicator to move in proportion to the time that elapses after the occurrence of the primary signal, and means actuated by the sound receiver for de-energizing said rotatable electro-magnetic member and for energizing said stator member to stop the motion of said armature and said indicator upon the receipt of said complementary signal.

2. In a distance measuring device utilizing the echo method, an indicator movable along a predetermined path, means for moving said indicator at a predetermined speed along said path, a sound transmitter, means for operating said sound transmitter to give a short impulse beginning at a certain point in the movement of said indicator, a sound receiver and means operated by the effect of the echo of the transmitted impulse on the receiver for stopping said indicator.

3. In a distance measuring device utilizing the echo method, an indicator movable along a predetermined path, means for moving said indicator at a predetermined speed along said path, a sound transmitter, means for operating said sound transmitter to give a short impulse beginning at a certain point in the movement of said indicator, a sound receiver, means operated by the effect of the echo of the transmitted impulse on the receiver for stopping said indicator, and a member cooperating with the indicator graduated in units of length to measure the lapsed time until the receipt of the echo after the sound impulse given when the indicator is at zero on the graduated member.

4. In a distance measuring device utilizing the echo method, a rotatable indicator, means adapted to rotate said indicator at a constant speed, normally inactive electro-magnetic means adapted, when energized, to stop said indicator, a sound transmitter, means for operating said sound transmitter to give a short sound impulse while said indicator is passing a predetermined point, a sound receiver and means operated upon the receipt of a signal impulse by the sound receiver for energizing said electro-magnetic means to stop said indicator.

5. In a distance measuring device utilizing the echo method, a rotatable indicator, means adapted to rotate said indicator at a constant speed, normally inactive electro-magnetic means which, when energized, will stop said indicator, a sound transmitter, means for operating said sound transmitter when said indicator is at a predetermined position, a relay having an off contact and a cooperating armature contact, means for moving said armature to circuit closing positions on said contacts, a circuit including one of said contacts and the electro-magnet of said electro-magnetic stopping means, a second circuit including a coil of said relay, means normally energizing said coil and said circuit to hold the relay controlled circuit to said electro-magnetic stopping means open, sound receiving means and means for reducing the current in the relay coil circuit to permit the relay to close the circuit of the electro-magnetic stopping means on the receipt of a sound signal through the sound receiving means.

6. In a method for determining distance by the receipt of an echo, the steps which comprise moving an indicator along a scale at a predetermined speed, emitting the sound impulse during the movement of said indicator when at a certain position on said scale, receiving the echo of said impulse and stopping the movement of the indicator upon the receipt of said echo.

7. In depth finding apparatus which includes a rotatable indicator for determining the lapse of time, rotary means for actuating the same, vibratory means for transmitting the primary signal and means for receiving the echo, the improvements which comprise, a two-positioned relay, said relay having coils and connections to actuate its armature to one position by the action of two currents but to maintain it in that position by the action of one current, and to actuate it to the other position when said last current is changed, a rotatable armature, means to operate said indicator in accordance with the movements of said rotatable armature, means to rotate said rotatable armature when the relay armature is in the said one position and to stop it when said relay armature is in said other position, means to create continually one of said currents, means to create momentarily the other of said currents when said indicator indicates approximately zero, whereby the relay armature is actuated to one position, and also to actuate said sound transmitting means, and means responsive to the echo of said sound acting upon said receiving means to change said continual current whereby said relay armature is actuated to said other position.

8. In depth finding apparatus which includes a rotatable indicator for determining the lapse of time, rotary means for actuating the same, vibratory means for transmitting the primary signal and means for receiving the echo, the improvements which comprise, a two-positioned relay, said relay having coils and connections to actuate its armature to one position by the action of two currents but to maintain it in that position by the action of one current, and to actuate it to the other position when said last current is changed, a rotatable armature, means to operate said indicator in accordance with the movements of said rotatable armature, means to rotate said rotatable armature when the relay armature is in the said one position and to stop it when said relay armature is in said other position, means to create continually one of said currents, means to create momentarily and periodically the other of said currents at periods chosen to be greater than the time for making a depth reading, whereby the relay armature is actuated to one position at the beginning of each period, and also to actuate said sound transmitting means, and means responsive to the echo of said sound acting upon said receiving means to change said continual current whereby said relay armature is actuated to said other position.

9. In distance finding, apparatus by which the time elapsing between the transmission of a primary signal and the reception of the complementary signal, initiated simultaneously with the former, is indicated by a rotatable indicator, the improvements which comprise, a sound receiving device including a rotatable indicator, a continuous rotatable shaft connected with said indicator, an annular armature having resilient supports fixed on said shaft and capable of swayable movement in axial directions thereon, rotating magnetic means having an electric energizing circuit and located on one side of said annular armature, devices for rotating said magnetic means at a constant speed, a switch for energizing the circuit of said rotating magnetic means coincidentally with the occurrence of said primary signal, and fixed magnetic means located on the opposite side of said annular armature and connected with said receiving device that is responsive to said complementary signal, said annular armature being stopped and started by the attractions of said stationary and rotating magnetic means respectively.

10. A controlling device for starting and stopping a traveling indicator or the like, comprising, a rotatable shaft, resilient supports fixed thereon, an annular armature carried by said supports and capable of transverse movement, rotating electro-magnetic means located on one side of said annular armature and fixed electro-magnetic means located on the other side of said annular armature, for rotating and stopping said armature in accordance with the energizing of said magnets, respectively.

11. A controlling device for starting and stopping a traveling indicator or the like, comprising, a rotatable shaft, an annular armature fixed thereon by resilient supports so as to be capable of transverse movements substantially parallel to the axis of said shaft, an electro-magnetic rotor mounted concentrically with said armature and adjacent one side thereof, an electro-magnetic stator mounted concentrically with said armature and adjacent the opposite side thereof, and means for energizing said rotor and said stator respectively to rotate and stop said armature in accordance with the energizing of said rotor and stator, respectively.

WILLIAM L. WALKER.